(12) United States Patent  
Chaudry

(10) Patent No.: US 6,714,612 B1  
(45) Date of Patent: Mar. 30, 2004

(54) METHOD AND DEVICE FOR SYNCHRONIZATION OF PHASE MISMATCH IN COMMUNICATION SYSTEMS EMPLOYING A COMMON CLOCK PERIOD

(75) Inventor: Shailender Chaudry, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 647 days.

(21) Appl. No.: 09/590,935

(22) Filed: Jun. 8, 2000

(51) Int. Cl.$^7$ ............................. H04L 7/00; H03K 3/289
(52) U.S. Cl. ...................................... 375/368; 327/202
(58) Field of Search ................................ 375/368, 365, 375/360, 359, 375, 376; 370/350, 503; 327/202, 221, 212, 225

(56) References Cited

U.S. PATENT DOCUMENTS 5,282,210 A * 1/1994 Slegel et al. ................. 370/537
5,736,946 A * 4/1998 Sohn ............................ 341/67
6,359,479 B1 * 3/2002 Oprescu ..................... 327/141
6,496,555 B1 * 12/2002 Soda ........................... 375/376

OTHER PUBLICATIONS

Seaborne et al. (Hewlett–Packard Company, IBM Corporation), *Infrared Data Association Link Management Protocol*, Version 1.1, Jan. 23, 1996.

Williams et al. (IBM Corporation, Hewlett–Packard Company, Apple Computer, Inc. Counterpoint Systems Foundry, Inc.) *Infrared Data Association Serial Infrared Link Access Protocol* (*IrLAP*), Version 1.1, Jun. 16, 1996.

Millar et al. (Hewlett–Packard Company): *The IrDA Standards for High-Speed Infrared Communications*, The Hewlett–Packard Journal, Feb. 1998.

* cited by examiner

*Primary Examiner*—Khai Tran
(74) *Attorney, Agent, or Firm*—Martine & Penilla, LLP

(57) ABSTRACT

An apparatus to overcome a metastable state in a communication system employing a common clock period includes a first latch and a second latch, the first latch being clocked by a clock signal and the second latch being clocked by an inverted version of said clock signal, each of the first and second latches receiving a data stream. A delay device delays the output of the second latch by one half of a cycle of the clock signal. A multiplexer outputs the output of the first latch when the received data stream does not exhibit metastability relative to the clock signal and outputs the output of the delay device in the presence of metastability. By latching the data according to the inverted clock, the data is not latched during state transitions thereof and metastability is avoided. The delay device re-synchronizes the latched data with the active edges of the clock signal.

23 Claims, 4 Drawing Sheets ns- respective active high clock signals. Moreover, both the transmitter clock and the receiver clocks signals have a constant and equal period. Indeed, the transmitter and receiver devices, in FIG. 1, have previously negotiated a common data rate with period 1/f, or the frequency f may have been protocol-mandated as the single common frequency at which data is to be exchanged. For example, according to the IrLAP protocol, both infrared devices may be configured to initially exchange data at the common rate of 9600 bps.

METHOD AND DEVICE FOR SYNCHRONIZATION OF PHASE MISMATCH IN COMMUNICATION SYSTEMS EMPLOYING A COMMON CLOCK PERIOD

BACKGROUND OF THE INVENTION

1. Field of the Invention

This invention relates to the field of synchronization of phase mismatch in communication systems employing clocks having a common period. More particularly, the present invention relates to methods and devices for recovering from a metastable state in potentially phase-mismatched communication systems employing a common clock period.

2. Description of the Related Art

Current trend in personal digital assistants, personal communications systems and portable computing devices, peripherals and organizers point to the growing popularity of wireless communications. In particular, many consumer products now have the ability to communicate with other devices by means of, for example, RF or infrared data transfer. For some applications, infrared communications has many advantages not possessed by other data transfer modalities. Infrared communication devices are inexpensive, compact, have wide bandwidth and are highly secure, as infrared transceivers are typically limited by both line of sight and by short distance. In such wireless communications systems, the transfer speed may be predetermined or may be contemporaneously negotiated between the communicating devices.

To promote interoperability, many wireless communications protocols have been standardized across manufacturers of wireless communications devices. One such standard-setting organization is the Infrared Data Association (http://www.irda.org), which promulgates standards for infrared communications. For example, according to the Serial Infrared Link Access Protocol (IrLAP) version 1.1 (incorporated herein by reference in its entirety), the initial baud rate between any two IrLAP-compliant devices is set at 9600 bits per second (bps) during a discovery or contention stage, with the provision of a fall-back speed of 2400 bps. During this stage, the two devices attempt to communicate predetermined bit sequences to ascertain the maximum data rates sustainable by both devices. According to IrLAP ver. 1.1, the transmitting device transmits data packets including a series of predetermined bit sequences (called a preamble) to the other device. The other device then attempts to recover the transmitted preamble. However, there are occasions when the receiving clock cannot be synchronized to the timing of the incoming data from the transmitting device, resulting in failed communications and no data transfer between the two devices. This may occur, for example, when the transmitting and receiving clocks are metastable relative to one another. Metastability refers to the state wherein an active clock edge and a data transition occur very close to one another. Such a metastable situation is depicted in FIG. 1.

In the timing diagram of FIG. 1, the transmitting device transmits data (a digital bit string of "1010" in the example of FIG. 1) according to a transmitter clock, which is active high. That is, the state changes (data transitions) occur at or very close to the rising edges of the transmitter clock pulses. The receiver device attempts to acquire the data sent by the transmitting device by timing the sampling of the data also on the rising edge of its clock, as shown in FIG. 1. Both transmitting and receiving devices in FIG. 1 operate on The first data bit shown begins its transition form a low voltage value to a high voltage value at the rising edge of the first transmitter clock pulse shown. However, the receiver clock is not synchronized to the transmitter clock. Most of the time, this lack of synchronism between the transmitter and receiver clocks can be overcome and the data can be successfully acquired, latched and recognized. There is at least one situation, however, in which the flip-flop or latch acquiring the data bit string from the transmitting device cannot properly transition from its current state into the new state. This may occur when an active clock edge and a data transition occur very close together, as shown in FIG. 1. Indeed, the phase differential 10 between the transmitter clock and the receiver clock may be such that the active edge of the receiver clock occurs between the high and low voltage threshold magnitudes $V_{LT}$ and the $V_{HT}$. The low voltage threshold magnitude $V_{LT}$ and the high voltage threshold magnitude $V_{HT}$ may be defined as that voltage below and above which, respectively, a logical low state and logical high state value will be recognized. The manufacturer of the device in question typically does not warrant the behavior of the device between these threshold values, as device is in an indeterminate state, transitioning between a logical 0 and a logical 1. Should the active edge of the receiver clock, as shown in FIG. 1, occur at about the same time 20 as the data is transitioning (or anywhere within the interval between the timing of $V_{LT}$ and the $V_{HT}$), the receiver device may not be able to accurately recognize the data transmitted by the transmitter device. At time 20, the receiver may recognize a logical one, a logical zero, fluctuate between the two states or merely exhibit an increased time to output. The receiver device is then in a metastable state. In such a state, the latch or flip flop in the receiver may not immediately transition from its current state to a new state, as the new state is dictated by the transmitted data, which is itself sampled during a state transition. Moreover, this state is "stable", in that the receiver will continue to sample the transmitted data indefinitely just when the data is transitioning, as the period of the receiver clock is constant and equal (or substantially equal) to that of the transmitting device. This is shown at reference numeral 30 in FIG. 1, in which the third active edge of the receiver clock samples the transmitted data once again between $V_{LT}$ and the $V_{HT}$.

FIG. 2 is a conceptual diagram illustrating metastability. As shown therein, a metastable state $V_M$ may be likened to the state of a ball atop a hill. The ball, in this state, may roll in either one of two directions to rest either in a stable low state $V_L$ or in a stable high state $V_H$. The metastable state $V_M$ itself, however, is an indeterminate state, neither a logical high nor a logical low. Noise may eventually change the state of the ball from the metastable state to either of the stable states. However, before such change of state occurs, the state of the ball remains indeterminate. In digital sequential circuits, such a metastable state may cause the output of the flip-flop or latch within the receiver to oscillate or to itself assume an indeterminate state.

Such a metastable state, therefore, will persist for an indefinite period of time unless remedial action is under-taken. It is thus desirable to remedy such a metastable condition. Conventionally, the solution is to reset either the transmitter or the receiver or to somehow change the phase differential 10 between their respective clocks. As the phase differential 10 during which metastability may occur is fairly small, it is likely that cycling either or both of the transmitter and receiver devices on and off will solve the problem, as the active edges of the receiver clock are somewhat unlikely to consecutively reappear just during the interval in which the data is transitioning states. Another way to get out of a metastable state is to sample at a much higher rate (greater than two times, for example) than the rate at which the data is sent. Such solutions, however, are believed to be less than optimal, as it may require the user(s) of the devices to reset the device(s) or to turn the device(s) on and off before re-attempting any data transfers or may require an overly high sampling rate. What are needed, therefore, are devices and methods for recovering from a metastable state in phase-mismatched communication systems employing a common clock period.

SUMMARY OF THE INVENTION

The principles of the present invention provide for devices and methods that are able to recover from such a metastable state.

A device to overcome a metastable state in a communication system employing a common clock period, according to an embodiment of the present invention, comprises a first latch and a second latch, the first latch being clocked by a clock signal and the second latch being clocked by an inverted version of said clock signal, each of the first and second latches receiving a data stream; a delay device, the delay device delaying an output of the second latch by one half of a cycle of said clock signal; and a multiplexer, said multiplexer outputting said output of said first latch when said received data stream does not exhibit metastability relative to said clock signal and outputting an output of said delay device in a presence of metastability.

A sequence recognizer may be included, the sequence recognizer being configured to recognize a predetermined bit sequence on the output of the first latch and to control the multiplexer to output the output of the delay device upon failing to detect the predetermined bit sequence. The delay device may include a latch clocked by the clock signal.

The present invention may also be viewed as a method of receiving a data signal in a communication system wherein both transmitter and receiver employ a common clock period, comprising a first acquiring step of acquiring the data signal on respective first active edges of a clock signal; detecting a presence of metastability relative to said respective first active edges and said data signal; a second acquiring step of acquiring said data signal on respective second active edges of said clock signal; and synchronizing said data signal acquired on said respective second active edges with said first active edges.

The respective first active edges may be rising edges of the clock signal and the respective second edges may be falling edges of the clock signal. Alternatively, the respective first active edges may be falling edges of the clock signal and the respective second edges may be rising edges of the clock signal. The first acquiring step may include a step of latching the data signal in a first latch clocked by the clock signal. The second acquiring step may include a step of latching the data signal in a second latch clocked by an inverted version of the clock signal. A step of outputting the data signal acquired on the respective first active edges of said lock signal may be carried out when metastability is not detected. A step of outputting the synchronized data signal may be carried out when metastability is detected. The detecting step may include a step of recognizing a selected bit sequence, the metastability being inferred upon failure of the recognizing step to recognize said predetermined bit sequence. The synchronizing step may include a step of delaying the data signal acquired on the respective second active edges by one half cycle of the clock signal. The first and second acquiring steps may be carried out concurrently.

The present invention is also a transceiver, comprising means for transmitting data according to a clock signal having a period; means for receiving data, including first means for acquiring data on respective first active edges of a clock signal having said period; means for detecting a presence of metastability relative to said respective first active edges and said data; second means for acquiring said data on respective second active edges of said clock signal; means for synchronizing said data acquired on said respective second active edges with said first active edges; and means for outputting said data acquired on said respective first active edges when metastability is not detected and outputting said synchronized data when metastability is detected.

The transmitting means and the receiving means each may include an infrared device. The synchronizing means may include means for delaying the data for half of cycle of the clock signal. The detecting means may include means for detecting the presence of a predetermined bit sequence in the acquired data. The respective first active edges may be rising edges of the clock signal and the respective second edges may be falling edges of the clock signal. Alternatively, the respective first active edges may be falling edges of the clock signal and the respective second edges may be rising edges of the clock signal. The first acquiring means may include first latching means for latching the data, the first latching means being clocked by the clock signal. The second acquiring means may include second latching means for latching the data, the second latching means being clocked by an inverted version of the clock signal.

BRIEF DESCRIPTION OF THE DRAWINGS

For a further understanding of the advantages of the present invention, reference should be made to the following detailed description, taken in conjunction with the accompanying figures, in which.

DESCRIPTION OF THE INVENTION

Figure 8:
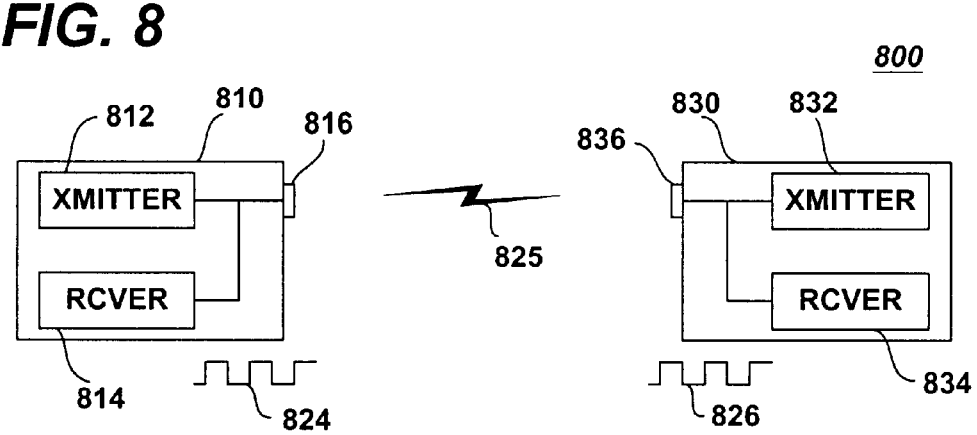
FIG. 8 is an illustration of a communication system suitable for carrying the present invention.

FIG. 8 shows a communication system 800. The communication system 800 may include a first device 810 and a second device 830. Each of the first and second devices 810, 830 may include a wireless transceiver, such as a radio, laser-based or infrared device, for example. As shown in FIG. 8, the first device 810 may include a transmitter 812 and a receiver 814, both coupled to a transducer 816, such as an antenna, infrared diode or laser diode, for example. Similarly, the second device 830 may include a transmitter 832 and a receiver 834, both coupled to a transducer 836, such as an antenna, infrared diode or laser diode, for example. The first device 810 sends and receives data 825 according to a clock signal 824 and the second device 830 sends and receives data 825 according to a clock signal 826. The period of the clock signals 824 and 826 may be predetermined before the communication between the devices 810, 830 takes places br may be contemporaneously and adaptively negotiated upon initiation of the communication between the two devices. In any event, the period (the inverse of the clock frequency) of the two clock signals 824, 826 is common (the same or substantially the same) between the two devices 810, 830.

Figure 1:
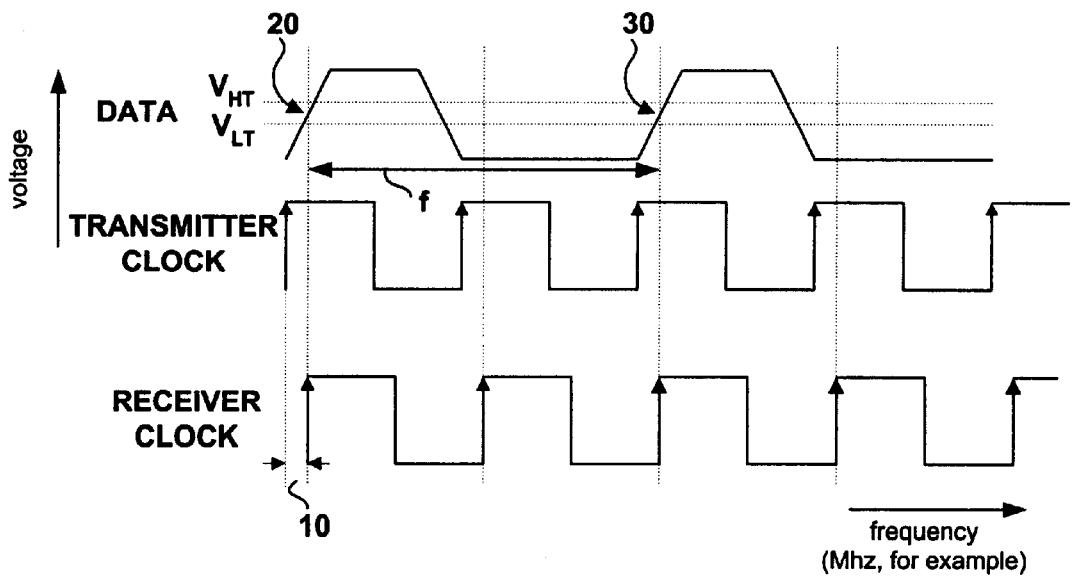
FIG. 1 is a timing diagram illustrating an instance wherein a metastable state has occurred between a transmitting device and a receiving device or between one transceiver device and a receiver or another transceiver device.
Figure 2:
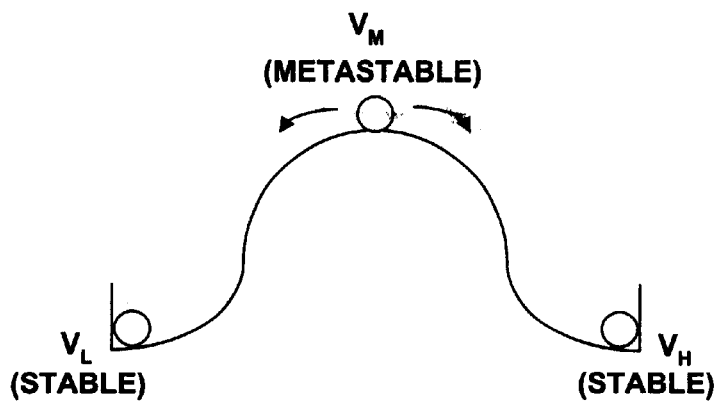
FIG. 2 is a conceptual diagram illustrating a metastable state.
Figure 3:
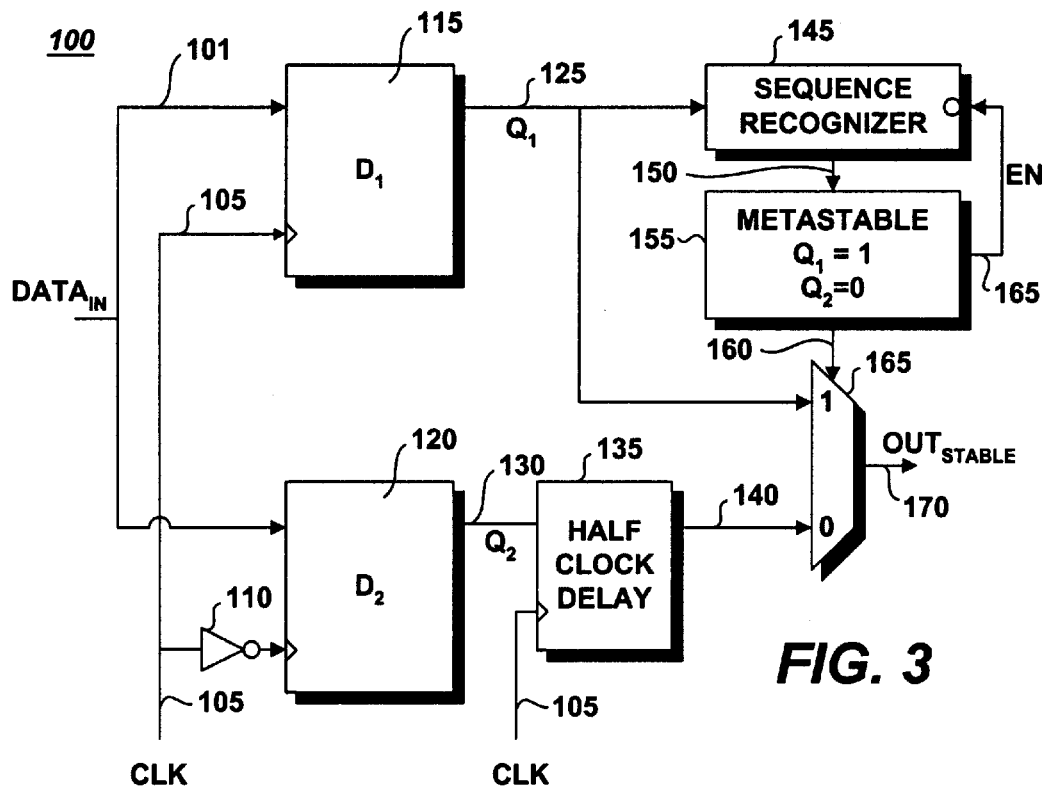
FIG. 3 is a circuit diagram illustrating an embodiment of the present invention.
Figure 4:
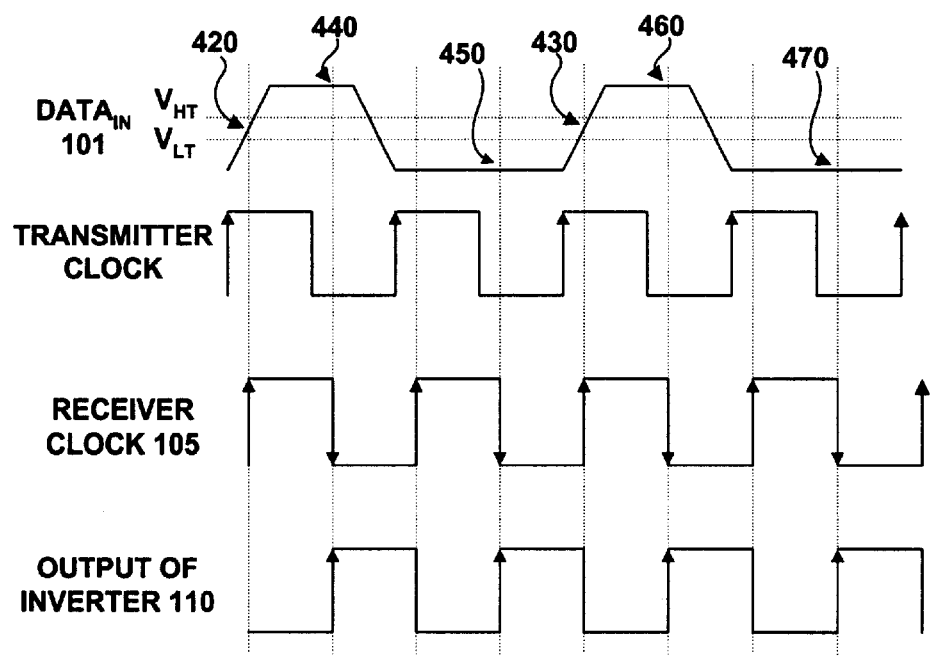
FIG. 4 is a timing diagram illustrating the manner in which the circuit of FIG. 3 overcomes the metastable state between the transmitting and receiving devices.

FIG. 3 is a circuit diagram illustrating a circuit 100 for recovering from a metastable state in a phase-mismatched communication system employing such a common clock period, according to an embodiment of the present invention. FIG. 4 is a timing diagram illustrating the manner in which the circuit of FIG. 3 overcomes the metastable state between the transmitting and receiving devices. Considering now FIGS. 3 and 4 collectively, the data transmitted by a transmitter device (such as device 810 of FIG. 8, for example) is received by a receiver device (such as device 830 of FIG. 8, for example) as the input data stream $DATA_{IN}$ 101. The received input data stream $DATA_{IN}$ 101 is fed both to a first latch $D_1$ 115 and to a second latch $D_2$ 120. The first latch $D_1$ 115 latches the input data stream $DATA_{IN}$ 101 according to the receiver device's clock signal CLK 105. The clock signal 105 is also inverted by inverter 110 and fed to the clock input of the second latch $D_2$ 120. Both the receiver clock CLK 105 and the output of inverter 110 are shown in the timing diagram of FIG. 4. Assuming that both devices operate on an active high clock signal, the input data stream $DATA_{IN}$ 101 is latched by the first latch $D_1$ on the rising (leading) edge of the receiver clock CLK 105 and on the falling (trailing) edge of the receiver clock CLK 105 by the second latch $D_2$. That is, the rising edge of the output of the inverter 110 corresponds to the falling edge of the receiver clock CLK 105.

The present invention takes advantage of the realization that, should a metastable state occur on the rising edge of the receiver clock CLK 105, the timing of the next falling edge of the receiver clock CLK 105 is such that a metastable state does not occur. Indeed, as shown in FIG. 4, the rising edge of the receiver clock CLK 105 occurs at time 420, just as the $DATA_{IN}$ 101 signal is transitioning from a low voltage value to a high voltage value. In other words, metastability occurs because the rising edge of the receiver clock CLK 105 occurs between $V_{LT}$ and $V_{HT}$, when the logical value of the input data stream $DATA_{IN}$ 101 is indeterminate. However, as shown in FIG. 4, by the time of the next falling edge of the receiver clock CLK 105 (corresponding to the rising edge of the output of inverter 105), $DATA_{IN}$ 101 has settled into its new (high) logical state, at time 440. Because of the timing of the active edges of the receiver clock CLK 105, the $DATA_{IN}$ signal 101 may not be properly latched by the first latch $D_1$, which may oscillate, exhibit a delayed clock-to-output time, for example, due to the metastable state established between the transmitter device and the receiver device. The second latch $D_2$, however, is clocked by an inverted receiver clock signal CLK 105. Therefore, the input data stream $DATA_{IN}$ 101, as clocked by the transmitter clock, is not metastable with the inverted receiver clock and can thus readily be latched by the receiver device's second latch $D_2$. As shown in FIG. 4, the inverted receiver device clock signal CLK 105 is equivalent to the receiver clock CLK 105, delayed by one half of a receiver device clock cycle.

Figure 5:
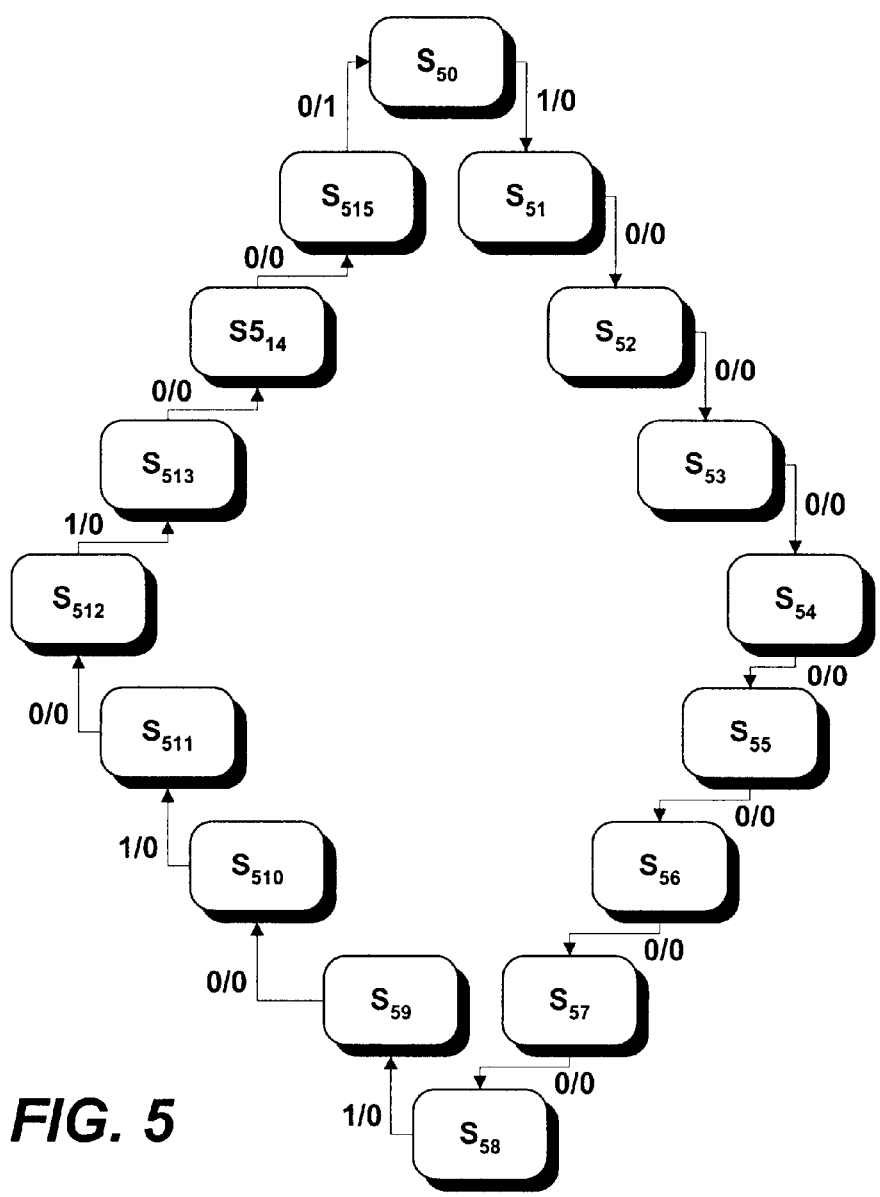
FIG. 5 is a diagram of an embodiment of a state diagram implemented by the sequence recognizer block of FIG. 3.

The non-inverting output $Q_1$ 125 of the first latch $D_1$ may be fed into a device that validates the input data stream $DATA_{IN}$ 101, as it is latched. Such a validating device may take the form of a sequence or signature recognizer, as shown in FIG. 3 at reference 145 or most any other device that can validate the integrity of the input data stream $DATA_{IN}$ 101. According to the IrDA protocol IrLAP, the communication between the transmitter device and the receiver device is packetized into frames, each frame including a preamble comprising a predetermined bit sequence. For example, the preamble may include the following bit sequence: "100 0000 1010 1010". In this case, the sequence recognizer 145 may implement the 15 state ($S_{50}$ to $S_{515}$) state machine illustrated in FIG. 5. As shown in FIG. 5, the sequence recognizer device 145 outputs a logical 0 until the exact bit sequence "100 0000 1010 1010" is recognized. In FIG. 5, transitioning from one state to the next state is contingent upon receiving the correct next bit in the sequence. For example, to transition from state $S_{58}$ to state $S_{59}$, the input to the sequence recognizer must be a logical 1, as the sixth least significant bit of the above-defined bit sequence is 1. The transitions from state to state are noted in FIG. 5 in the format IN/OUT, where IN represents the input 125 to the sequence recognizer and OUT represents the output 150 of the sequence recognizer 145. It is to be noted that the present invention is not to be limited by the presence, structure and/or functionality of the sequence recognizer 145. Indeed, the sequence recognizer 145 may be omitted altogether or replaced by any circuit that possesses the functionality necessary to validate the incoming data input stream.

Figure 6:
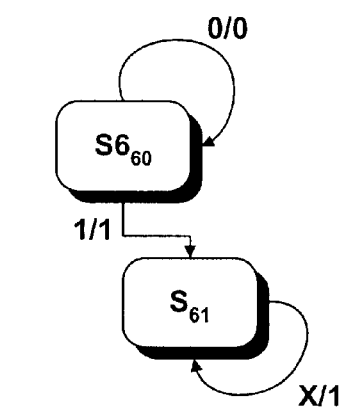
FIG. 6 is a diagram of an embodiment of a state diagram of the selector device of FIG. 3.

The non-inverting output $Q_1$ 125 of the first latch $D_1$ may also, as shown in FIG. 5, be fed to a first input of a multiplexer 165, or other functionally equivalent device. The output of the sequence recognizer 145 may be fed to a selector device 155. The selector device 155 drives the selector line 160 that controls the output of the multiplexer 165. The selector device 155 may implement the state machine shown in FIG. 6. As shown therein, the output of the selector device 155 is 0 as long as the sequence recognizer 145 outputs a 0 ($S_{60}$) and 1 when the sequence recognizer 145 outputs a 1 ($S_{61}$), indicating that the predetermined sequence has been acquired and recognized. Thereafter, the output of the selector device 155 is 1, irrespective of the input from the sequence recognizer, until the selector device 155 is reset.

The output $Q_2$ 130 of the second latch $D_2$ 120 is then delayed by one half of a clock cycle of the receiver device by the half clock delay device 135 shown in FIG. 3. The half clock delay device 135 is clocked by the same receiver clock CLK 105 as is the first latch $D_1$ 115 and the second latch $D_2$ 120 (albeit through inverter 110). This one-half (½) clock cycle delay is carried out to re-synchronize the data input stream $DATA_{IN}$ 101 latched by the second latch device $D_2$ 120 back to the leading edge of the receiver clock CLK 105.

This allows the acquired data stream $DATA_{IN}$ 101 to effectuate state transitions on the leading edge of the receiver clock CLK 105, rather on the falling edge thereof. The one-half clock cycle delayed output 140 of the half clock delay device 135 is then fed to the second input of the multiplexer 165. Therefore, when the sequence recognizer 145 recognizes the predetermined bit sequence, the $Q_1$ output 125 of the first latch $D_1$ 115 is selected and outputted as the output $OUT_{STABLE}$ 170 of the multiplexer 165. When, however, the sequence recognizer 145 does not recognize the predetermined bit sequence, it may be presumed that a metastable state between the $DATA_{IN}$ 101 and the receiver clock CLK 105 has occurred. In this case, the predetermined bit sequence is not recognized and the sequence recognizer 145 outputs a 0, causing the selector device 155 to output a 0 on its output 160. As the multiplexer 165 now has a 0 on its selector input, the signal 140 is output as the $OUT_{STABLE}$ signal 170. As shown in FIG. 3, an active low EN enable signal 165 may be fed back from the selector device 155 to an enable input on the sequence recognizer 145. The enable signal EN 165 may disable the sequence recognizer 145 during portions of the transmission wherein it is not desired to attempt detection of a bit sequence, preamble or the like. This prevents erroneous chance detection of the predetermined bit sequence during outside of time frames when receipt of such is expected.

Whereas the rising edges of the receiver clock CLK 105 may give rise to a metastable state relative to the input stream $DATA_{IN}$, the corresponding falling edges of CLK 105, according to the present invention, occur sufficiently later in time to have allowed the data to have settled to its next logical state, but before the next transition. If the $DATA_{IN}$ signal 101 is latched at a timing corresponding to the falling edges of the receiver clock CLK 105, the $DATA_{IN}$ signal 101 may be successfully acquired, latched, output and/or processed. This is again shown in FIG. 4, in which the rising edge of the receiver clock CLK 105 occurs at time 430, just when the $DATA_{IN}$ signal 101 is transitioning from a low state to a high state. However, at the falling edge of the same receiver clock pulse, corresponding to the rising edge of the corresponding inverted receiver clock pulse output from the inverter 110, the $DATA_{IN}$ signal 101 has settled to its high state, as shown at reference 460.

The $DATA_{IN}$ signal 101, as shown in FIG. 3, represents a bit pattern equivalent to a digital value of "1010". When the data transmitted by the transmitting device and clocked by the transmitting device's clock is metastable with the receiver clock CLK 105, the receiver device cannot properly latch the $DATA_{IN}$ signal 101 on the rising edges of its CLK 105 signal. Indeed, in a metastable state, the receiver device would not be able to latch the bits of the aforementioned string "1010". Although the receiver would latch a 0 at 450 and at 470, the state transition at 430, for example, occur too close in time to the rising edge of the receiver clock CLK 105, causing the first latch $D_1$ 115, according to the present invention, to fail to latch the new value. However, this same receiver (or transceiver) device, according to the method and device of the present invention, may latch the $DATA_{IN}$ signal 101 on the falling edges of its receiver clock signal CLK 105, as shown at reference 460, and thereafter delay the thus latched $DATA_{IN}$ signal 101 by one-half of a clock cycle to re-synchronize the acquired data with the receiver clock's rising edges. Metastable states, in this manner, need not require resetting or cycling on and off either the transmitting or receiving devices, in order to change the relative phase difference between the clocks of the transmitting and receiving clocks.

Figure 7:
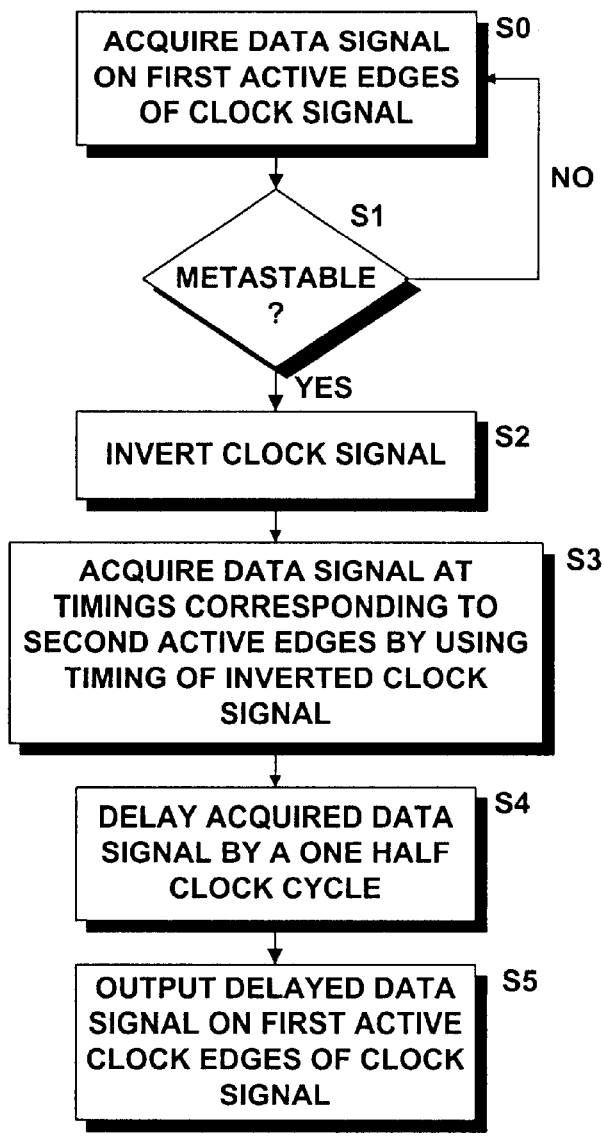
FIG. 7 is a flow diagram illustrating an embodiment of the method for synchronization of a phase-mismatched communication system employing a common clock period.

FIG. 7 is a flowchart of a method for overcoming a metastable state in such a communication system according to an embodiment of the present invention. In FIG. 7, references are made to first and second clock edges. For example, if the first clock edges refer to the rising (leading) edges of the clock signal, then the second clock edges refer to the falling (trailing) clock edges. Alternatively, if the first clock edges refer to the falling (trailing) edges of the clock signal, the second clock edges refer to the rising (leading) edges of the clock signal. As shown at step SO, the received data signal is acquired on the first active clock edges. Should metastability be detected or inferred as shown in step S1, from an inability to detect a bit sequence, preamble, characteristic signature, header or other predetermined information in the received bit stream, the receiver clock signal may be inverted, as shown at S2 and the $DATA_{IN}$ signal acquired using, for example, the rising edge of inverted clock, as shown at step S3. If no metastability is detected, the method may revert back to step S0. Should metastability be established, however, the rising edges of the inverted clock signal (corresponding to the falling (second active) edges of the non-inverted receiver device clock signal CLK 105) will be used to acquire (e.g., latch, for example) the $DATA_{IN}$ signal 101. As the latched $DATA_{IN}$ signal 101 is clocked out of the latch (such as latch $D_2$ 120 in FIG. 3), it is delayed by one half-clock cycle, as shown at step S4. In this manner, the delayed $DATA_{IN}$ signal 101 may be output on the first edges of the receiver device clock signal CLK 105. The acquired $DATA_{IN}$ signal 101 may then, for example, fill a buffer, whereupon an interrupt may be generated to alert the receiver device's software of the incoming data.

The present invention may find advantageous use in any communication systems relying upon phase-mismatched clocks having a common clock period. Such common clock period may be predetermined or may be adaptively negotiated by the two devices at the time of the communication. For example, the transmitting and receiving devices may implement the IrLAP protocol for infrared communications.

While the foregoing detailed description has described embodiments of the present invention, it is to be understood that the above description is illustrative only and not limiting of the disclosed invention. For example, the latching, delaying and/or sequence recognizing devices disclosed herein may be substituted for other functionally equivalent devices. Other modifications may occur to those of skill in this art. Thus, the present invention to be limited only by the claims as set forth below.

What is claimed is:

1. A device to overcome a metastable state in a communication system employing a common clock period, comprising:

a first latch and a second latch, the first latch being clocked by a clock signal and the second latch being clocked by an inverted version of said clock signal, each of the first and second latches receiving a data stream;

a delay device, the delay device delaying an output of the second latch by one half of a cycle of said clock signal; and a multiplexer, said multiplexer outputting an output of said first latch when said received data stream does not exhibit metastability relative to said clock signal outputting an output of said delay device in a presence of metastability.

2. The device of claim 1, further comprising a sequence recognizer, sequence recognizer being configured to recognize a predetermined bit sequence on said output of said first latch and to control said multiplexer to output said output of said delay device upon failing to detect said predetermined bit sequence.

3. The device of claim 1, wherein said delay device includes a latch clocked by said clock signal.

4. A method of receiving a data signal in a communication system wherein both transmitter and receiver employ a common clock period, comprising:
   a first acquiring step of acquiring the data signal on respective first active edges of a clock signal;
   detecting a presence of metastability relative to said respective first active edges and said data signal;
   a second acquiring step of acquiring said data signal on respective second active edges of said clock signal; and
   synchronizing said data signal acquired on said respective second active edges with said first active edges.

5. The method of claim 4, wherein said respective first active edges are rising edges of said clock signal and wherein said respective second edges are falling edges of said clock signal.

6. The method of claim 4, wherein said respective first active edges are falling edges of said clock signal and wherein said respective second edges are rising edges of said clock signal.

7. The method of claim 4, wherein said first acquiring step includes a step of latching the data signal in a first latch clocked by said clock signal.

8. The method of claim 4, wherein said second acquiring step includes a step of latching the data signal in a second latch clocked by an inverted version of said clock signal.

9. The method of claim 4, further including the step of outputting said data signal acquired on said respective first active edges of said clock signal when the presence of metastability is not detected.

10. The method of claim 4, further including the step of outputting said synchronized data signal when the presence of metastability is detected.

11. The method of claim 4, wherein the detecting step includes a step of recognizing a selected bit sequence, said metastability being inferred upon failure of said recognizing step to recognize said predetermined bit sequence.

12. The method of claim 4, wherein said synchronizing step includes a step of delaying said data signal acquired on said respective second active edges by one half cycle of said clock signal.

13. The method, of claim 4, wherein said first and second acquiring steps are carried out concurrently.

14. A transceiver, comprising:
   means for transmitting data according to a clock signal having a period;
   means for receiving data, including:
      first means for acquiring data on respective first active edges of a clock signal having said period;
      means for detecting a presence of metastability relative to said respective first active edges and said data;
      second means for acquiring said data on respective second active edges of said clock signal;
      means for synchronizing said data acquired on said respective second active edges with said first active edges; and
      means for outputting said data acquired on said respective first active edges when metastability is not detected and outputting said synchronized data when metastability is detected.

15. The transceiver of claim 14, wherein said transmitting means and said receiving means each include an infrared device.

16. The transceiver of claim 14, wherein said synchronizing means includes means for delaying said data for half of cycle of said clock signal.

17. The transceiver of claim 14, wherein said detecting means includes means for detecting a presence of a predetermined bit sequence in said acquired data.

18. The transceiver of claim 14, wherein said respective first active edges are rising edges of said clock signal and wherein said respective second edges are falling edges of said clock signal.

19. The transceiver of claim 14, wherein said respective first active edges are falling edges of said clock signal and wherein said respective second edges are rising edges of said clock signal.

20. The transceiver of claim 14, wherein said first acquiring means includes first latching means for latching the data, said first latching means being clocked by said clock signal.

21. The transceiver of claim 14, wherein said second acquiring means includes second latching means for latching the data, said second latching means being clocked by an inverted version of said clock signal.

22. A device to overcome a metastable state in a communication system employing a common clock period, comprising:
   a first latch and a second latch, the first latch being clocked by a clock signal and the second latch being clocked by an inverted version of said clock signal, each of the first and second latches receiving a data stream;
   a delay device, the delay device delaying an output of the second latch by one half of a cycle of said clock signal; and
   a multiplexer, said multiplexer outputting an output of said first latch when said received data stream does not exhibit metastability relative to said clock signal outputting an output of said delay device in a presence of metastability, and further including a sequence recognizer, sequence recognizer being configured to recognize a predetermined bit sequence on said output of said first latch and to control said multiplexer to output said output of said delay device upon failing to detect said predetermined bit sequence.

23. A transceiver, comprising:
   circuitry for transmitting data according to a clock signal having a period;
   circuitry for receiving data, including:
      first circuitry for acquiring data on respective first active edges of a clock signal having said period;
      circuitry for detecting a presence of metastability relative to said respective first active edges and said data;
      second circuitry for acquiring said data on respective second active edges of said clock signal;
      circuitry for synchronizing said data acquired on said respective second active edges with said first active edges; and
      circuitry for outputting said data acquired on said respective first active edges when metastability is not detected and outputting said synchronized data when metastability is detected.

* * * * *